Jan. 20, 1959   J. W. ORENDORFF   2,869,491
ATTACHMENT FOR PLANTERS AND THE LIKE
Filed Oct. 18, 1954   2 Sheets-Sheet 1
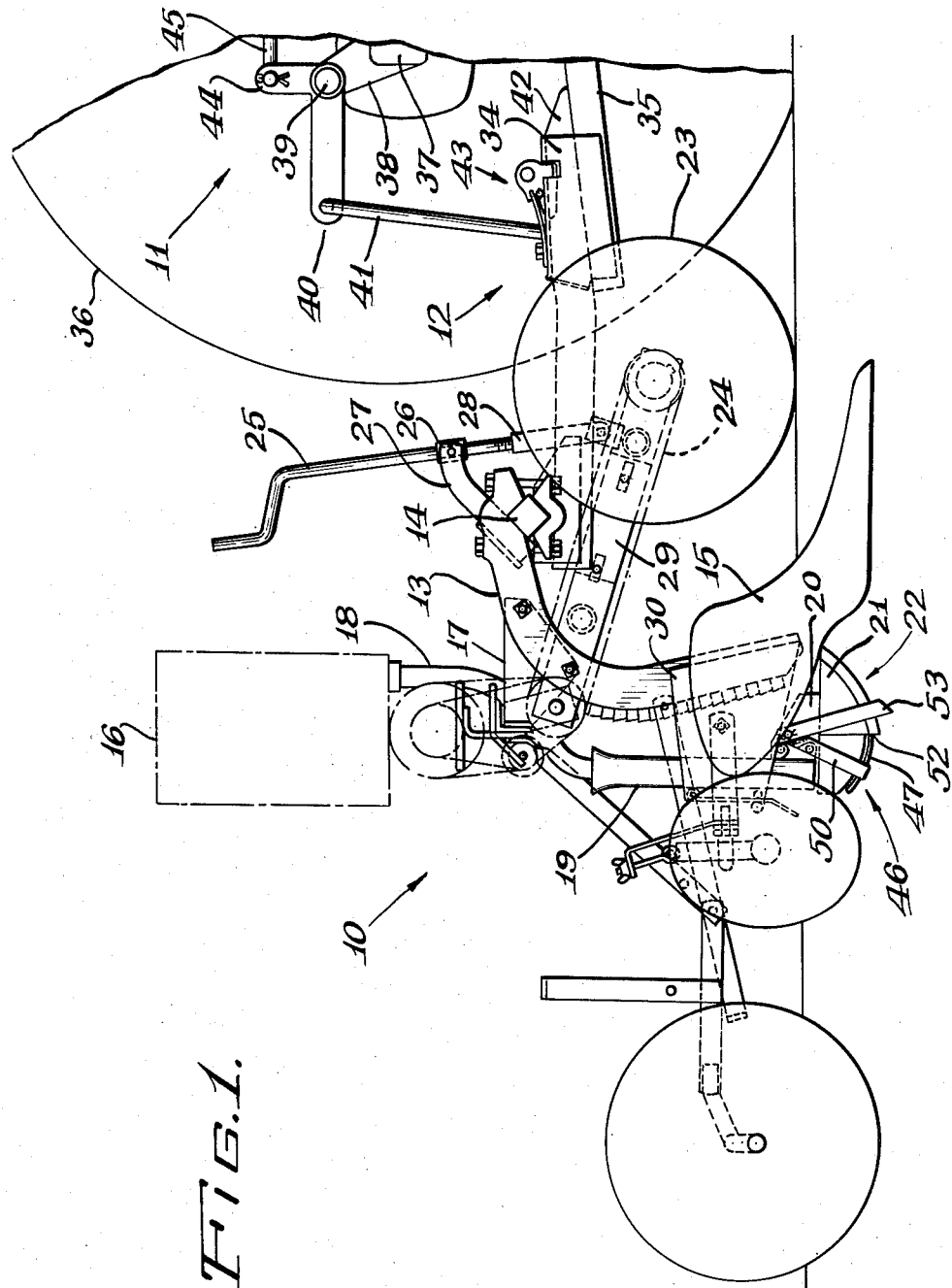
Inventor.
John W. Orendorff
Paul O. Pippel Atty.

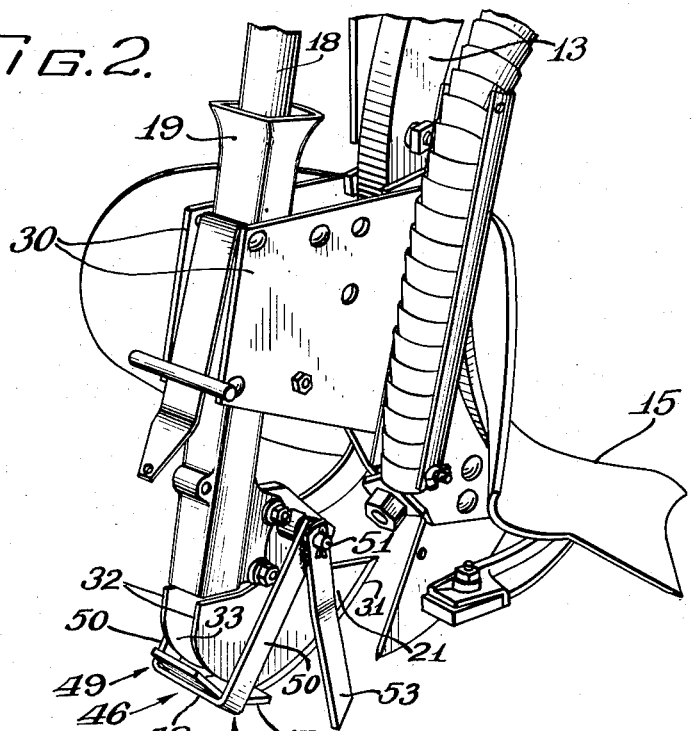
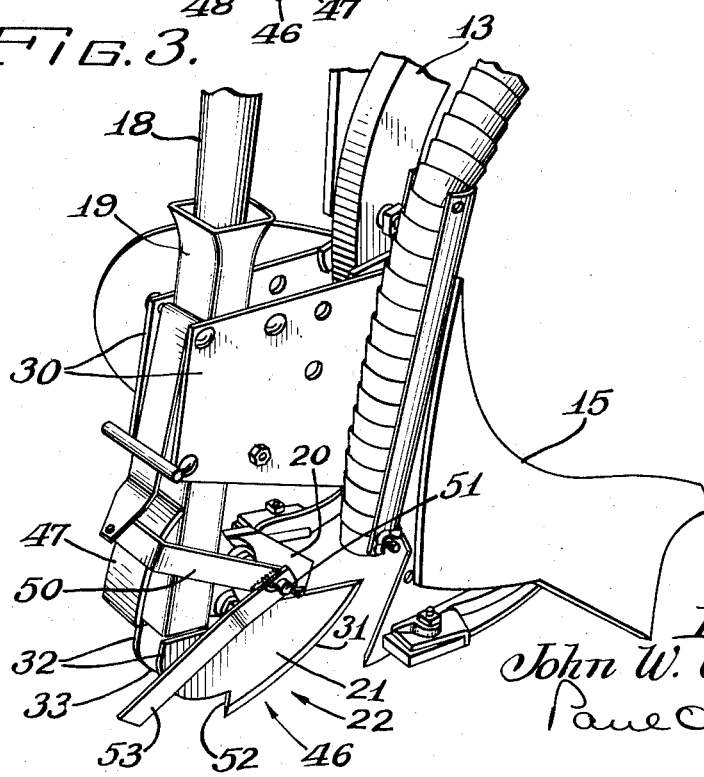

United States Patent Office 2,869,491
Patented Jan. 20, 1959

2,869,491

ATTACHMENT FOR PLANTERS AND THE LIKE

John W. Orendorff, Canton, Ill., assignor to International Harvester Company, a corporation of New Jersey Application October 18, 1954, Serial No. 462,838

1 Claim. (Cl. 111—86)

This invention relates to agricultural implements. More particularly, the invention concerns material dispensing apparatus wherein a furrow is formed in the soil by an earth penetrating tool and seed, fertilizer or the like is fed from a supply source through guide means associated with the furrow forming tool and deposited in the furrow formed thereby.

A furrow-forming tool is customarily lifted above the ground to an inoperative position when turning at the end of a field and is again lowered to the ground when operation is resumed. The furrow-forming tool, which opens the furrow in the ground for the reception of the seed, fertilizer and the like, has a passage therethrough providing an opening at the bottom of the tool to confine the material received from the guiding devices and assure the deposition of the material in the furrow. The furrow opener unit including the earth penetrating tool is frequently operated under moist soil conditions and the planting units frequently hit the ground with considerable force when being lowered from transport to operating positions. The result is that soil becomes packed in the opening or passage in the furrow opener through which the material falls, blocking the passage of said material to the ground. This condition sometimes escapes the attention of the planter operator momentarily, and when it is discovered it is necessary for him to clean out the discharge passages before the operation can proceed. The present invention contemplates the provision of means for overcoming the foregoing obstacles and has for its object the provision of means for protecting the opening in the bottom of the furrow opener from plugging by soil when the implement is lowered to its operating position.

Another object of the invention is the provision of a novel closure means associated with a furrow opener unit, which covers the discharge opening at the bottom of the furrow forming tool when the dispenser is lowered to its operating position, and prevents the plugging or choking of the discharge outlet for the material when the furrow opener unit is lowered to the ground.

Another object of the invention is the provision, in a planter or the like, of a closure in the form of a gate or the like which covers the discharge outlet in the earth penetrating tool when the implement is lowered to the ground, and which is automatically displaceable from said discharge outlet in response to passage of the tool through the soil, to accommodate the discharge of material.

Another object of the invention is the provision of a cover for the discharge outlet of a planter furrow opener which is in closed position with respect to said discharge outlet when the implement is moved to its operating position, and which is provided with an actuator member engageable with the ground and functioning as a lever to hold the cover member out of its closed position with respect to said discharge outlet in response to passage of the furrow opener through the ground.

Other objects and advantages of the invention will become clear from the following detailed description when read in conjunction with the accompanying drawings, wherein:

Figure 1 is a view in side elevation of the rear end of a tractor having mounted thereupon a material dispenser in the form of a planting attachment incorporating the features of this invention;

Figure 2 is a somewhat enlarged view in perspective of the apparatus of this invention showing the relationship of the furrow opener unit to a lister plow bottom, and showing the closure member of this invention in its operating position with respect to the material discharge outlet; and Figure 3 is a view similar to Figure 2 showing the closure member held out of closed position with respect to said discharge outlet.

The invention is described herein in its application to a tractor mounted implement of the lister planter type wherein the implement is vertically moved between operating and transport positions by its direct connection to the tractor, power for raising and lowering the implement being derived from the tractor power plant. However, the invention is equally applicable to dispensing apparatus of the trail behind type wherein the earth penetrating unit is capable of independent vertical movement between operating and transport positions.

The implement illustrated in the drawings is an agricultural lister with a planting attachment and is generally designated by the numeral 10. It is made integral with a traveling carrier or implement support in the form of a tractor 11 through the intermediary of a hitch structure 12. The general construction of the implement 10 is conventional and includes a downwardly curved beam 13 affixed at its forward end to a transverse tool bar 14 and having mounted upon its lower end a middlebuster or lister bottom 15.

A seed hopper is mounted by suitable brackets 17 upon the beam 13, and seed is dispensed therefrom through a flexible tube 18 and a rigid vertical guide tube 19 projecting upwardly from a support in the form of a boot 20 for the earth penetrating tool 21 of a furrow opener unit designated at 22. Also mounted upon the beam 13 is a gauge wheel 23 which operates the mechanism by which feed is discharged from the hopper 16 through the intermediary of a chain drive designated at 24. Adjustment of the gauge wheel 23 relative to the beam 13 is accomplished by a threaded crank 25 mounted in a swivel 26 carried at the end of a bracket 27 affixed to the tool bar 14. The threaded end of the crank 25 is received in a threaded sleeve 28 pivotally connected to the arm 29 by which the wheel 23 is mounted upon the beam 13.

Seed tube 19 carrying planter boot 20 and the furrow opening tool 21 is supported between a pair of laterally spaced plates 30 affixed to the beam 13. The furrow forming tool 21, as best shown in Figures 2 and 3, has its forward edge 31 sharpened and is bifurcated at its rear end to provide laterally spaced wings 32, which constitute a vertical passage 33 having a discharge outlet at the base of the furrow forming tool. Seed or the like leaving the guide tube 19 enters the passage 33 between the wings 32, and the material is deposited in the furrow formed by the tool 21. It is the passage or discharge outlet 33 which becomes clogged with dirt when the furrow opener is lowered to its operating position.

Raising and lowering of the implement 10 is accomplished through the hitch apparatus 12 which comprises laterally spaced longitudinally elongated socket-like members 34, only one of which is shown, mounted upon one of the bars 35 of a draft frame which is connected to the tractor in draft-receiving relation, in a manner not shown, accommodating vertical movement of the draw frame and of the socket members relative to the tractor. The tractor or other traveling support 11 is provided with laterally spaced drive wheels 36, only one of which is shown, and is also provided with a transverse rear axle structure indicated at 37. A bracket 38 is mounted upon the axle structure 37 and supports a transversely extending rockshaft 39 to which is affixed a rearwardly extending lift arm 40 pivotally connected by a link 41 to the socket member 34. Each of the socket members 34 slidably receives an elongated shaft member 42 affixed to and projecting forwardly from the tool bar 14 of the implement. Latch means 43 is provided to secure the shaft member 42 against displacement relative to the socket 34. The implement 10 is thus made integral with the traveling carrier 11 through the intermediary of the hitch 12, and the implement 10 moves vertically as a unit with the hitch 12. Raising the implement to transport position on the tractor is accomplished by an arm 44 affixed to and projecting upwardly from the shaft 39 and connected by a rod 45 to suitable power transmission means on the tractor, preferably deriving power from the tractor power plant. Rocking of the shaft 39 in a clockwise direction as viewed in Figure 1 raises the implement 10 above the ground to be carried on the tractor. The reverse procedure lowers the implement to its operating position.

In order to avoid clogging of the outlet 33 when the implement is lowered to the ground, applicant has provided a closure means for the outlet indicated at 46 and comprising a cover member or gate, arcuately shaped and designated by the numeral 47. Cover 47 is affixed, as by welding, to the transverse portion 48 of a U-shaped member 49, the arms 50 of which extend upwardly and are pivotally mounted upon a pivot pin 51 carried by the boot 20. The member 49 is thus capable of swinging movement about the axis of pin 51 from an operating position such as shown in Figure 2 wherein the cover 47 closes the discharge outlet in the furrow opener 21. This position of the closure 47 is accomplished by gravity and is the normal position thereof when the implement has been raised from the ground. Likewise, in this position, the closure or gate 47 engages a shoulder 52 on the earth penetrating tool 21, to limit the forward swinging of the arms 50. It should, of course, be clear that with the gate 47 covering the discharge outlet in the furrow opening tool 21, this outlet cannot become clogged with dirt when the implement is lowered to its operating position and thus interfere with the discharge of material into the furrow.

Simple and efficient means are provided for automatically opening the gate 47 so that material can be discharged through the passage 33, comprising an actuator arm 53 mounted on the pin 51 and affixed to the right hand arm 50 of the member 49. The lower end of arm 53 aggressively engages the ground and acts as a lever as the implement is propelled forwardly over the ground to swing the cover member 47 to the inoperative position of Figure 3. The closure 46 remains in the position of Figure 3 until the implement is raised to transport position on the tractor, whereupon it resumes by gravity the position shown in Figures 1 and 2. The closure 46 thus serves as a valve which is closed until the implement is placed in operation and then is automatically opened by the action of the soil upon the lever arm 53 as the implement is propelled across the ground.

The invention has been described in its preferred embodiment only and it should be understood that modifications may be made therein without departing from the spirit of the invention or the scope of the appended claim.

What is claimed is:

In a mobile planter or the like including a hopper for material to be dispensed to the ground and a furrow opener unit vertically movable between operating and transport positions, said furrow opener unit comprising an earth penetrating portion and a portion providing an outlet at the base of the furrow opener for the discharge of said material to the furrow formed thereby, an arm pivotally mounted on the furrow opener unit, a gate supported by said arm and movable by gravity into a position to cover said discharge outlet when the furrow opener unit is lifted from the ground, and an actuator member affixed to said arm adapted to engage and scrape the ground during forward movement of the planter to hold the gate open with respect to said outlet.

References Cited in the file of this patent

UNITED STATES PATENTS

| | | |
|---|---|---|
| 611,980 | Smith | Oct. 4, 1898 |
| 789,798 | Deterding | May 16, 1905 |
| 1,052,459 | Carr | Feb. 11, 1913 |
| 2,416,189 | McIntyre | Feb. 13, 1947 |
| 2,554,205 | Oehler | May 22, 1951 |